United States Patent [19]
Gibson

[11] Patent Number: 5,392,388
[45] Date of Patent: Feb. 21, 1995

[54] METHOD AND SYSTEM FOR VIEWING GRAPHIC IMAGES IN A DATA PROCESSING SYSTEM

[75] Inventor: Kevin P. Gibson, Rochester, Minn.

[73] Assignee: International Business Machines Corporation, Armonk, N.Y.

[21] Appl. No.: 985,991

[22] Filed: Dec. 4, 1992

[51] Int. Cl.$^6$ ............................................. G06F 15/62
[52] U.S. Cl. .................................. 395/159; 395/155; 345/121
[58] Field of Search ............... 395/155, 156, 157, 158, 395/159, 160, 161, 137; 340/727; 345/121, 123, 125

[56] References Cited

U.S. PATENT DOCUMENTS

| | | | |
|---|---|---|---|
| 4,786,897 | 11/1988 | Takanashi et al. | 395/157 |
| 4,831,556 | 5/1989 | Oono | 395/157 |
| 4,862,390 | 8/1989 | Weiner | 395/159 |
| 4,896,291 | 1/1990 | Gest et al. | 364/900 |
| 5,014,222 | 5/1991 | Donahue | 395/155 |
| 5,019,809 | 5/1991 | Chen | 340/727 |
| 5,051,898 | 9/1991 | Wright et al. | 364/200 |
| 5,062,060 | 10/1991 | Koinick | 364/521 |
| 5,065,347 | 11/1991 | Pajak et al. | 395/159 |
| 5,073,771 | 12/1991 | Satta et al. | 340/727 |
| 5,146,557 | 9/1992 | Yamron et al. | 395/161 |
| 5,148,154 | 9/1992 | MacKay et al. | 395/155 |

OTHER PUBLICATIONS

"Microsoft Windows User's Guide for the Windows Graphical Environment Version 3.0", Microsoft Corp. (1990), pp. 187–188.
Webster, J., "Extreme Wide Field-of-View Displays and the Enclosed Cockpit", IEEE/AIAA 10th Digital Avionics Systems Conference (Oct. 1991) pp. 399–404.
Yamashita, H. et al., "Interactive Visualization of Interaction Between Magnetic Flux Density and Eddy Currents in a 3D Steady State Field", IEEE Transactions on Magnetics, vol. 28 No. 2 (Jul. 1991) pp. 1778–1781.
IBM Technical Disc. Bulletin vol. 33 No. 6A, Nov. 1990, "3-D Slider Graphical Oject" pp. 291–293.
Research Disclosure No. 307, Nov. 1989, "Uses of the Spherical Selector".
Journal Paper Feb. 1986, "Improve Your Image" pp. 58–61.
Computer Corner, Trends in Analytical Chemistry, vol. 9, No. 2, 1990 "Mouse Manipulations in C", Janssens & Van Epsen.
IEEE Sep. 1984, pp. 66–77 "Design Analysis Of A Wide-Band Picture Communication System", Shum et al.
Provisional Programme 6th International Conference Sep. 2–6, 1991 "Digital Processing of Signals in Communications", Ireton & Xydeas, pp. 111 ∝ 116.
IBM Technical Disc. Bulletin vol. 36 No. 7, Jul. 1993, "Executive Scrolling Device" pp. 461–462.

*Primary Examiner*—Mark K. Zimmerman
*Assistant Examiner*—N. Kenneth Burraston
*Attorney, Agent, or Firm*—J. Michael Anglin; Duke W. Yee; Andrew J. Dillon

[57] ABSTRACT

The method and system of the present invention permit the efficient management of the display of a panoramic or wide-angle image on a display device in a data processing system. The panoramic image typically includes a number of segments wherein only a portion of those segments may be displayed on the display device at selected resolutions. The method and system of the present invention includes displaying a substantially circular icon, having a defined periphery. Each portion of the defined periphery corresponds to one or more of the segments making up the panoramic image. A moveable control element is displayed along a selected arc about the periphery. One or more of the segments of the panoramic image corresponding to each portion of the defined periphery within the selected arc may then be selected and is displayed on the display device by manipulating the position of the moveable control element.

16 Claims, 5 Drawing Sheets

METHOD AND SYSTEM FOR VIEWING GRAPHIC IMAGES IN A DATA PROCESSING SYSTEM

BACKGROUND OF THE INVENTION

1. Technical Field

The present invention relates in general to improved data processing systems and in particular, to improvements in manipulating data through a graphic user interface within a data processing system. Still more particularly, the present invention relates to improvements in a graphic user interface for manipulating the display of wide-angle images displayed in a data processing system.

2. Description of the Related Art

The manipulation of data in a data processing system is well known in the prior art. Data may be manipulated in many ways in a modern state-of-the-art data processing system including: data accessing, data encoding, data communications, data compression, data conversion, data entry, data exchange, data filing, data linking, data locking, data manipulation, data mapping, data modeling, data processing, data recording, data sorting, and data transferring. The large amounts of data that are available to the user of a modern state-of-the-art data processing system often become overwhelming in magnitude and complexity. These situations may often arise in the creation and execution of multimedia presentations.

Data processing systems are capable of communicating information to users in many formats, including: text, graphics, sounds, animated graphics, synthesized speech, and video. Multimedia presentations employ a data processing system to combine such information formats into a coherent and comprehensive presentation to the user.

As a result of the increasing complexity of data processing systems and with the introduction of multimedia presentations, attempts have been made to simplify the interface between a user and the large amounts of data present within a modern data processing system. One example of an attempt to simplify the interface between a user and a data processing system is the utilization of a so-called graphic user interface (GUI) to provide an intuitive and graphical interface between the user and the data processing system. A GUI is an interface system, including devices, by which a user interacts with a system, system components, and/or system applications via windows or view ports, icons, menus, pointing devices, etc.

The term "mouse", when utilized in this document, refers to any type of operating system supported graphical pointing device including, but not limited to: a mouse; track ball; light pen; touch screen; and, the like. A pointing device is typically employed by a user of a data processing system to interact with the data processing system's GUI. A "pointer" is an iconic image controlled by a mouse or other such devices, and is displayed on the video display device of a data processing system to visually indicate to the user icons, menus, or the like that may be selected or manipulated.

A "scroll bar" is a known user interface component that is associated with a scrollable area of a display, indicating to a user that more information is available and may be added in a particular direction with respect to the display. A scroll bar may be utilized to scroll additional data into view and a scroll bar typically includes a slider and scroll buttons.

Graphic images may consist of "wide-angle" or panoramic images generated by wide-angle or panoramic cameras. These wide-angle images may be digitized photographs or videos. Other graphic images may include, for example, computer generated images. One example of a computer generated image may include images for use in a planetarium type presentation. Hereinafter these type of images will be collectively referred to as "wide-angle images". Wide-angle images may be presented to a user in a multimedia presentation. When viewing this material on a multimedia data processing system, the screen or viewing window on the display device or video display terminal may not be capable of displaying the entire image at one time without distorting the image or reducing the clarity of the image. Presently available GUIs do not provide quick and easy manipulation of such wide-angle images.

Therefore, it would be desirable to have method and system for displaying portions of a wide-angle image and graphically and intuitively indicating which portion of the image is being displayed.

SUMMARY OF THE INVENTION

It is therefore one object of the present invention to provide an improved data processing system.

It is another object of the present invention to provide an improved method and system for manipulating data through a graphic user interface within a data processing system.

It is yet another object of the present invention to provide an improvement method and system in a graphic user interface for manipulating the display of wide-angle images displayed in a data processing system.

The foregoing objects are achieved as is now described. The method and system of the present invention permit the efficient management of the display of a panoramic or wide-angle image on a display device in a data processing system. The panoramic image typically includes a number of segments wherein only a portion of those segments may be displayed on the display device at selected resolutions. The method and system of the present invention includes displaying a substantially circular icon, having a defined periphery. Each portion of the defined periphery corresponds to one or more of the segments making up the panoramic image. A moveable control element is displayed along a selected arc about the periphery. One or more of the segments of the panoramic image corresponding to each portion of the defined periphery within the selected arc may then be selected and is displayed on the display device by manipulating the position of the moveable control element.

The present invention also provides for altering the length of the moveable control element in response to a user input. A new arc is then selected in response to altering the length of the moveable control element. The segments corresponding to the portions of the defined periphery within the new selected arc are then selected and displayed on the display device.

The moveable control element may be manipulated by a graphical pointing device, such as a mouse or a light pen. As a result, the display of a wide-angle or panoramic image may be efficiently managed.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
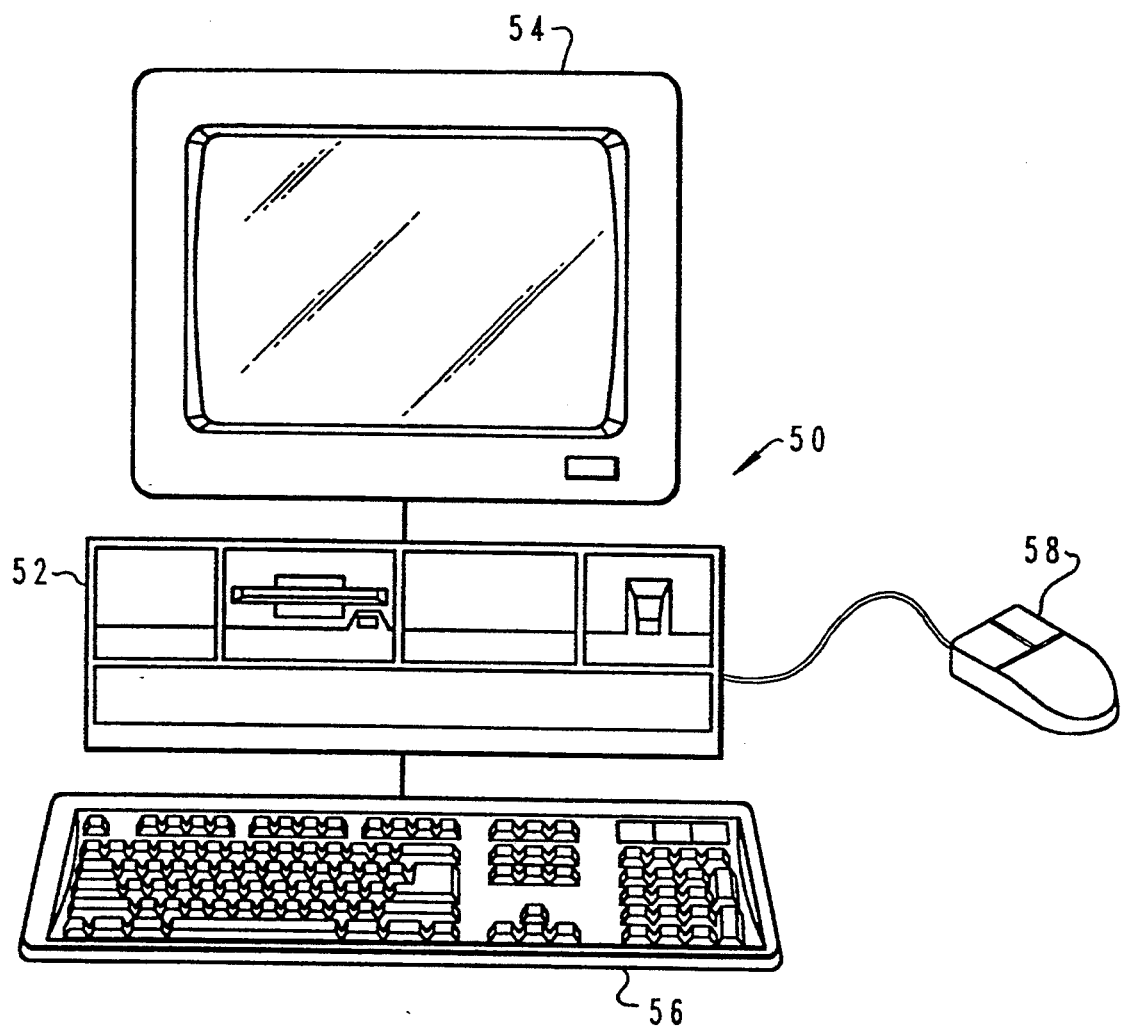
FIG. 1 is a pictorial representation of a personal computer system that may be utilized to implement the method and system of the present invention.

With reference now to the figures and in particular with reference to FIG. 1, there is depicted a pictorial representation of a computer system in which the present invention may be implemented in accordance with a preferred embodiment of the present invention. A personal computer 50 is depicted which includes a system unit 52, a video display terminal 54, a keyboard 56, and a mouse 58. Personal computer 50 may be implemented utilizing any suitable computer such as an IBM PS/2 computer, a product of International Business Machines Corporation, located in Armonk, N.Y. "PS/2" is a registered trademark of International Business Machines Corporation, located in Armonk. N.Y. Although the depicted embodiment involves a personal computer, a preferred embodiment of the present invention may be implemented in other types of data processing systems, such as, for example, intelligent work stations or minicomputers.

Figure 2:
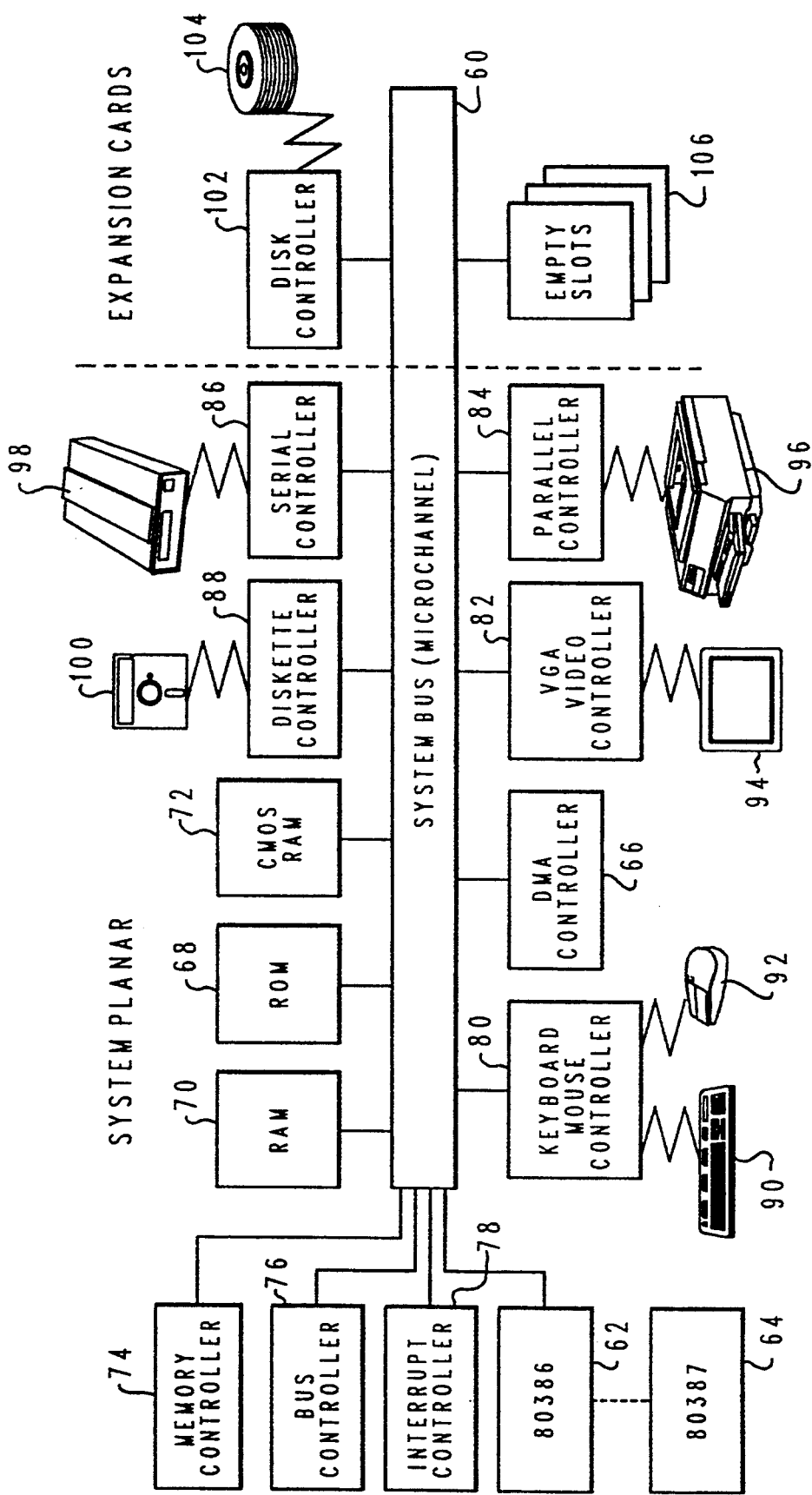
FIG. 2 is a block diagram of selected components in the personal computer system illustrated in FIG. 1 which may be utilized implementing the method and system of the present invention.

Referring now to FIG. 2, there is depicted a block diagram of selected components in personal computer 50 in which a preferred embodiment of the present invention may be implemented. System unit 52 preferably includes a system bus 60 for interconnecting and establishing communication between various components in system unit 52. Microprocessor 62 is connected to system bus 60 and also may have numeric coprocessor 64 connected to it. System bus 60 may be a Micro Channel system bus from International Business Machines Corporation. Micro Channel is a registered trademark of International Business Machines Corporation. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. Read only memory (ROM) 68 is mapped into the microprocessor 62 address space in the range from 640K to 1 megabyte. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk media, audio adapters, or chip programming devices such as a PAL or EPROM programming device, and the like also may be utilized in addition to or in place of the hardware already depicted. For example, various adapters designed for use with multimedia presentations, such as a high resolution graphics adapter, may be added to empty slots 106.

A graphical interface referred to as a "scrollcurve" is utilized, in 6 accordance with a preferred embodiment of the present invention, to control the portion of the image displayed on the screen of a multimedia data processing system, such as the IBM PS/2 computer depicted in FIG. 1. A "scrollcurve" is a graphic interface utilized to manipulate the viewing of images on a video display device or in a window within a video display device. The display of a single large image or many related images may be efficiently manipulated utilizing a scrollcurve graphic interface in accordance with a preferred embodiment of the present invention.

Figure 3:
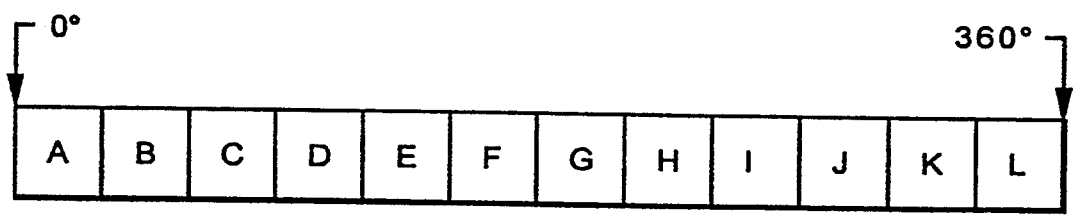
FIG. 3 depicts a pictorial representation of a wide-angle image that may be manipulated utilizing the method and system of the present invention.

Referring now to FIG. 3, a pictorial representation of a wide-angle or panoramic image that may be manipulated utilizing a scrollcurve graphic interface in accordance with a method and system of the present invention. Image 300 is preferably a 360 degree panoramic image. At a given resolution, only a portion of image 300 may be viewed on a video display device in a data processing system. Those portions of image 300 that are displayable on a video display device will depend upon the size of the display or the size of the window in which image 300 is being displayed for a given resolution. Image 300 may be subdivided into twelve equal segments or sections A, B, C, D, E, F, G, H, I, J, K, and L. These subdivisions or segments are arbitrary and are depicted and described only for purposes of illustrating a preferred embodiment of the present invention. In fact, in many situations no actual subdivisions are present. In these situations, the "segments" are arbitrary divisions utilized only for purposes of placing reference points within an image and are not necessarily actual boundaries within an image. Although section A is not depicted adjacent to section L, these two sections are adjacent in image 300. Section A begins at 0 degrees and section L ends at 360 degrees. Each section represents a 30 degree portion or section of an entire 360 degree image.

Figure 4:
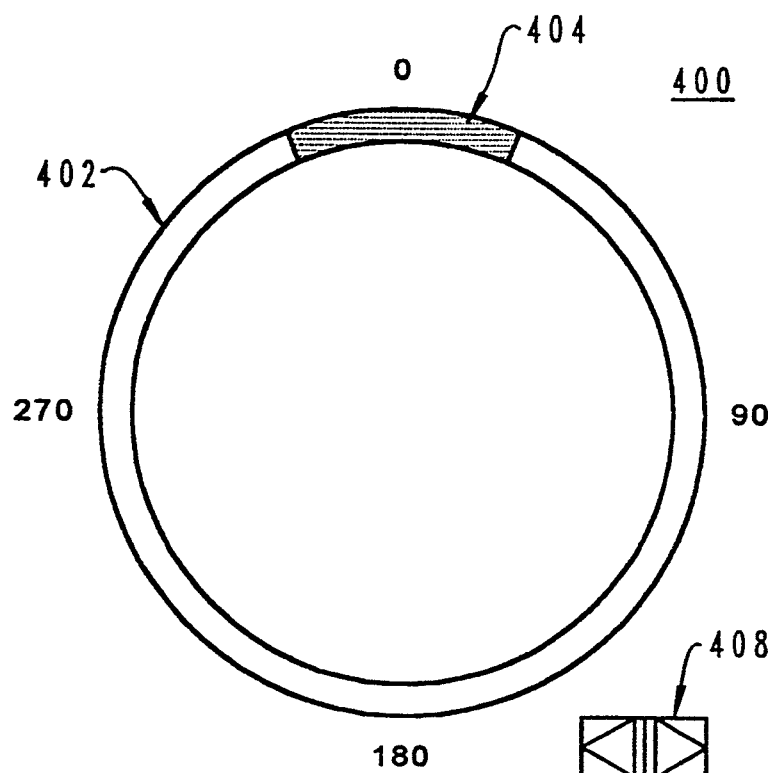
FIG. 4 is a graphic illustration of a graphic interface which may be altered to implement a preferred embodiment of the present invention.

With reference now to FIG. 4, an illustration of a scrollcurve graphic interface in accordance with a preferred embodiment of the present invention is depicted. Scrollcurve graphic interface 400 is an iconic controller formed in a circular shape and includes peripheral section 402 upon which curved slider 404 may be manipulated or moved by a mouse. Although peripheral section 402 is a circle in the depicted embodiment, it is contemplated that any substantially circular shape may be employed within a preferred embodiment of the present invention. "Substantially circular shape" as utilized herein shall mean any regular polygonal shape such as, for example, a hexagon or an octagon. A "substantially circular shape" also includes any substantial portions of a regular polygonal shape such as, for example, three-quarters of a circle.

Curved slider 404 selects the display of portions of image 300 from FIG. 3 in 60 degree portions or sections. For example, the entirety of two sections, i.e., D and E, may be displayed on the video display device or portions of three adjacent sections, i.e., J, K, and L adding up to 60 degrees may be displayed. Thus, 60 degrees of image 300 from FIG. 3 may be displayed on a display device or video display terminal at any one time at a given resolution. In its present position, curved slider 404 causes sections A and L from image 300 to be displayed. Furthermore, as will be explained in greater detail herein, the length of curved slider 404 may be altered utilizing button 406 and button 408.

The size or length of curved slider 404 in scrollcurve graphic interface 400 may be altered to increase or decrease the image viewed by a user utilizing button 406 or button 408. In response to such manipulation, the data processing system will redraw curved slider 404 having less or greater length, to the extent the resolution of the display system will permit a larger percentage of the image to be displayed. Of course, the viewable portion of an image may be limited by the display device or the window in the display device. Pointer 410 may be utilized to manipulate curved slider 404. Curved slider 404 may be moved by placing pointer 410 over curved slider 404 and selecting curved slider 404, by depressing a mouse button, in accordance with a preferred embodiment of the present invention.

Figure 5:
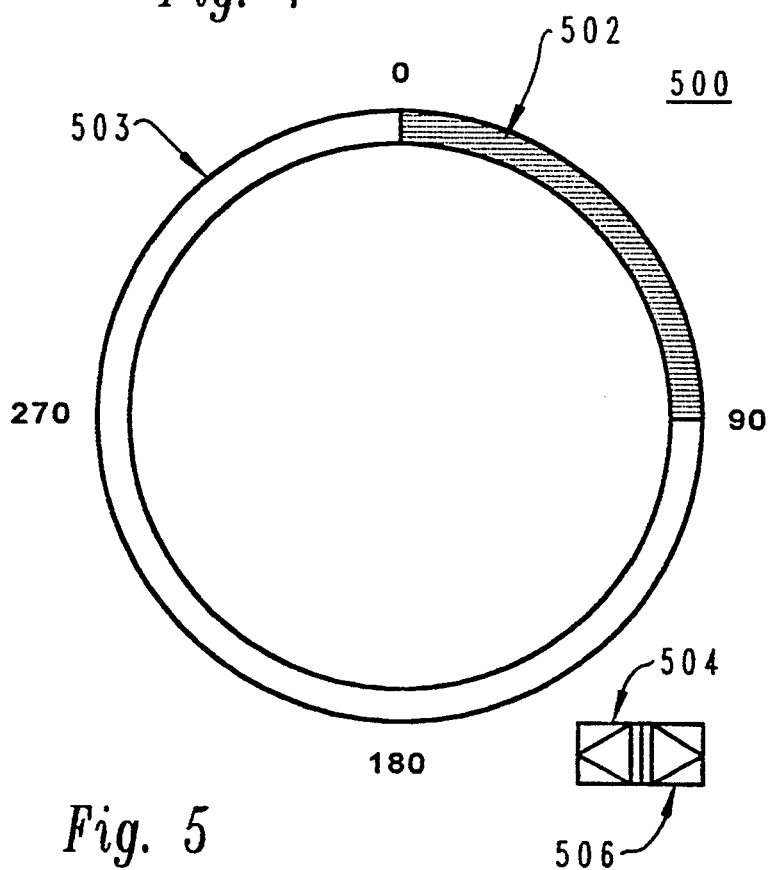
FIG. 5 depicts a graphic illustration of an altered graphic interface which may be utilized to implement a preferred embodiment of the present invention.

Referring now to FIG. 5, an altered scrollcurve graphic interface is depicted in accordance with a preferred embodiment of the present invention. Scrollcurve graphic interface 500 is similar to scrollcurve graphic interface 400, except curved slider 502 encompasses a 90 degree portion of the periphery of scrollcurve graphic interface 500, instead of 60 degrees. As mentioned above, the length of curved slider 502 along peripheral section 503 may be altered utilizing button 504 and button 506. Alternatively, the length of curved slider 502 may be altered by placing the mouse pointer over curved slider 502 and thereafter depressing one or more mouse buttons while moving the mouse pointer to select the length of curved slider 502. Again as with curved slider 404, curved slider 502 may be manipulated by a mouse to select particular portions of an image, such as image 300 from FIG. 3 for display on a video display device.

Another procedure that may cause an alteration in the size of a curved slider is altering or resizing the display window in which the image is being displayed. In the situation in which an image is being displayed within a window, the depicted length of the curved slider may change length in response to a change in the size of the windows in accordance with a preferred embodiment of the present invention. The length of the curved slider may increase or decrease, depending upon whether the display window increases or decreases in size, as those skilled in the art will appreciate upon reference to the present disclosure. For example, if a display window is increased in length, the portions of the image that may be displayed at one time may increase for a given resolution. As a result, the curved slider will be increased in length to visually depict the increased display capability of the display window. Conversely, if the size of the window is decreased in length, such that fewer portions of the image may be displayed on the display device, the curved slider will shorten to indicate the decreased portion of the image that is viewable at any one time for a given resolution, in accordance with a preferred embodiment of the present invention.

Although the depicted examples illustrate the display of a wide-angle image, other large images may also be manipulated utilizing a preferred embodiment of the present invention. Instead of marking the scrollcurve graphic interface from 0 degrees to 360 degrees, as depicted in FIGS. 4 and 5, the scrollcurve graphic interface may be marked in some other fashion to indicate what portion of an image may be selected, such as in centimeters. For example, if an image has a 100 centimeter span, the scrollcurve graphic interface may be marked from 0 to 100 centimeters with the slider indicating the portion of the image that is being displayed, i.e., 10 centimeters. Alternatively, arbitrary markings such as 0 to 1 or A to Q may be utilized, in accordance with a preferred embodiment of the present invention.

Although the depicted examples illustrate a scroll curve graphic interface as a complete circle, portions of a circle may be utilized in accordance with a preferred embodiment of the present invention. For example, if a wide-angle image is only 270 degrees instead of 360 degrees, the scrollcurve graphic interface would have an arc of 270 degrees. The slider could be moved within that arc and would stop at the edges of the arch.

Figure 6:
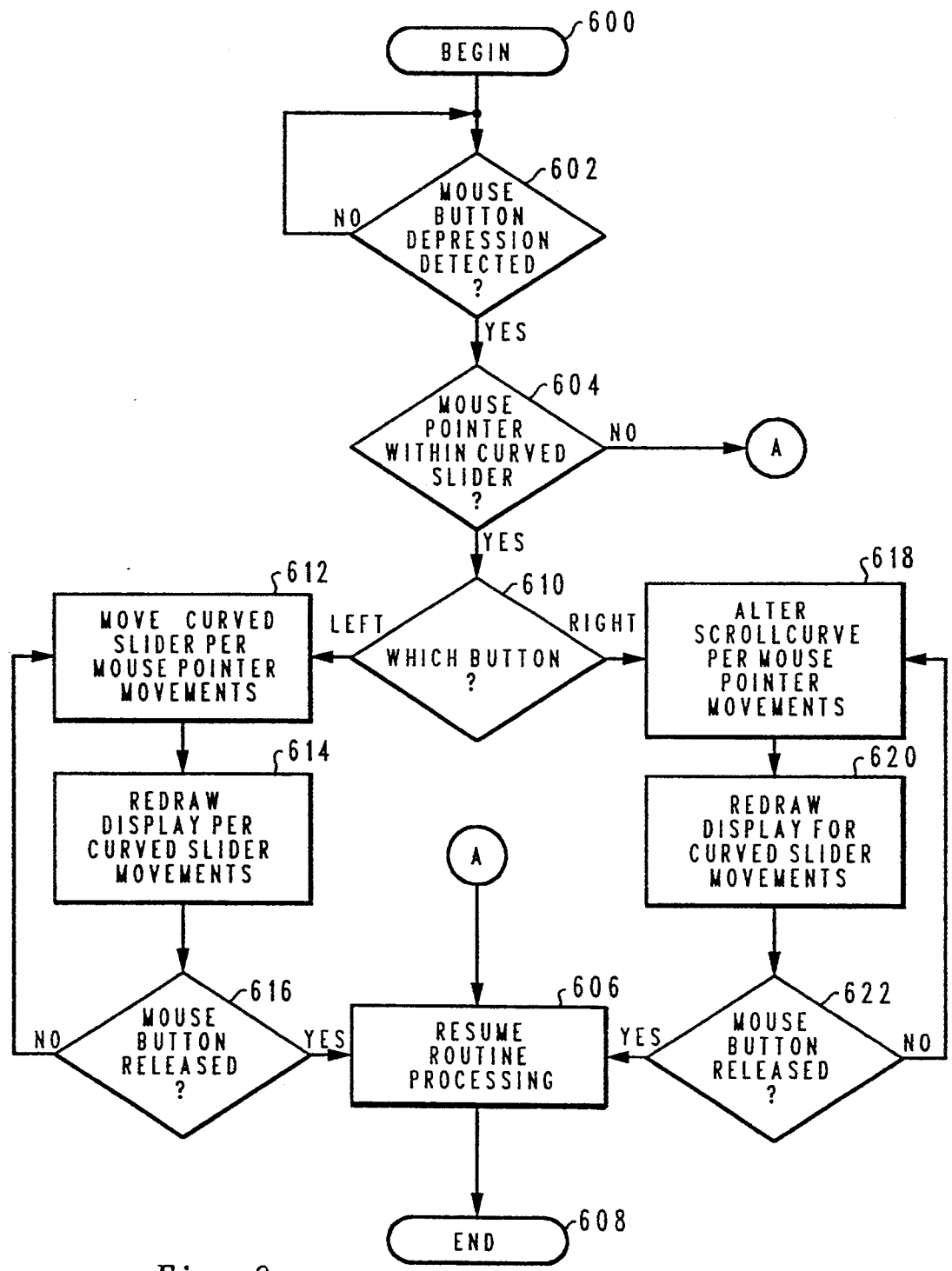
FIG. 6 is a high level logic flowchart illustrating a method and system for manipulating a wide-angle image in accordance with a preferred embodiment of the present invention.

With reference now to FIG. 6, a high level logic flowchart illustrating a method and system for manipulating a wide-angle image in accordance with a preferred embodiment of the present invention is illustrated. As depicted, the process begins in block 600 and thereafter passes to block 602. Block 602 illustrates a determination of whether or not a mouse button depression has been detected. After detecting the depression of a mouse button in block 602, the process proceeds to block 604, which depicts a determination of whether or not the mouse pointer is within a curved slider. If the mouse pointer is not within a curved slider, the process advances to block 606, which depicts the resuming of routine processing. Thereafter, the process terminates as illustrated in block 608.

Referring again to block 604, If the mouse pointer is within a curved slider, the process advances to block 610. Block 610 depicts a determination of which mouse button has been depressed. Those skilled in the art will appreciate that a typical mouse pointing device includes a left mouse button and a right mouse button. For a mouse having only a single mouse button, a single depression, or an alternate action such as, for example, a double depression of the mouse button may be utilized to select the curved slider. In the event that the left mouse button has been depressed, the process passes to block 612 and thereafter performs a standard "drag and drop" operation.

The "drag and drop" operation begins as illustrated in block 612 by moving the curved slider along the peripheral section of the scrollcurve graphic interface in accordance with the movements of the mouse. Next, the process advances to block 614, which depicts the redrawing of the display on the display device to display the new portions of the image selected by the curved slider. The different portions of the image being displayed may map directly to the periphery of the scrollcurve graphic interface, along which the curved slider is displayed.

Next, the process passes to block 616. Block 616 illustrates a determination of whether or not the mouse button has been released and if not, the process returns iteratively to block 612. In the event the mouse button has been released, the process passes to block 606, which depicts the resuming of routine processing. Thereafter, the process terminates as illustrated in block 608.

Referring again to block 61 0, in the event that the right mouse button has been depressed, the process then passes to block 618, which depicts the altering of the scroll bar appearance along the peripheral section of the scroll curve in accordance with the mouse movements. As described above, depending upon the movements of the mouse, the curved slider may increase or decrease in length. After altering the curved slider's appearance, in accordance with a preferred embodiment of the present invention, the process passes to block 620. Block 620 illustrates the redrawing of the display to depict those areas of the wide-angle image that are now selected by the altered curved slider.

Next, the process passes to block 622. Block 622 illustrates a determination of whether or not the mouse button has been released and if not, the process returns iteratively to block 618. In the event the mouse button has been released, the process passes to block 606, which depicts the resuming of routine processing. Thereafter, the process terminates as illustrated in block 608.

Figure 7:
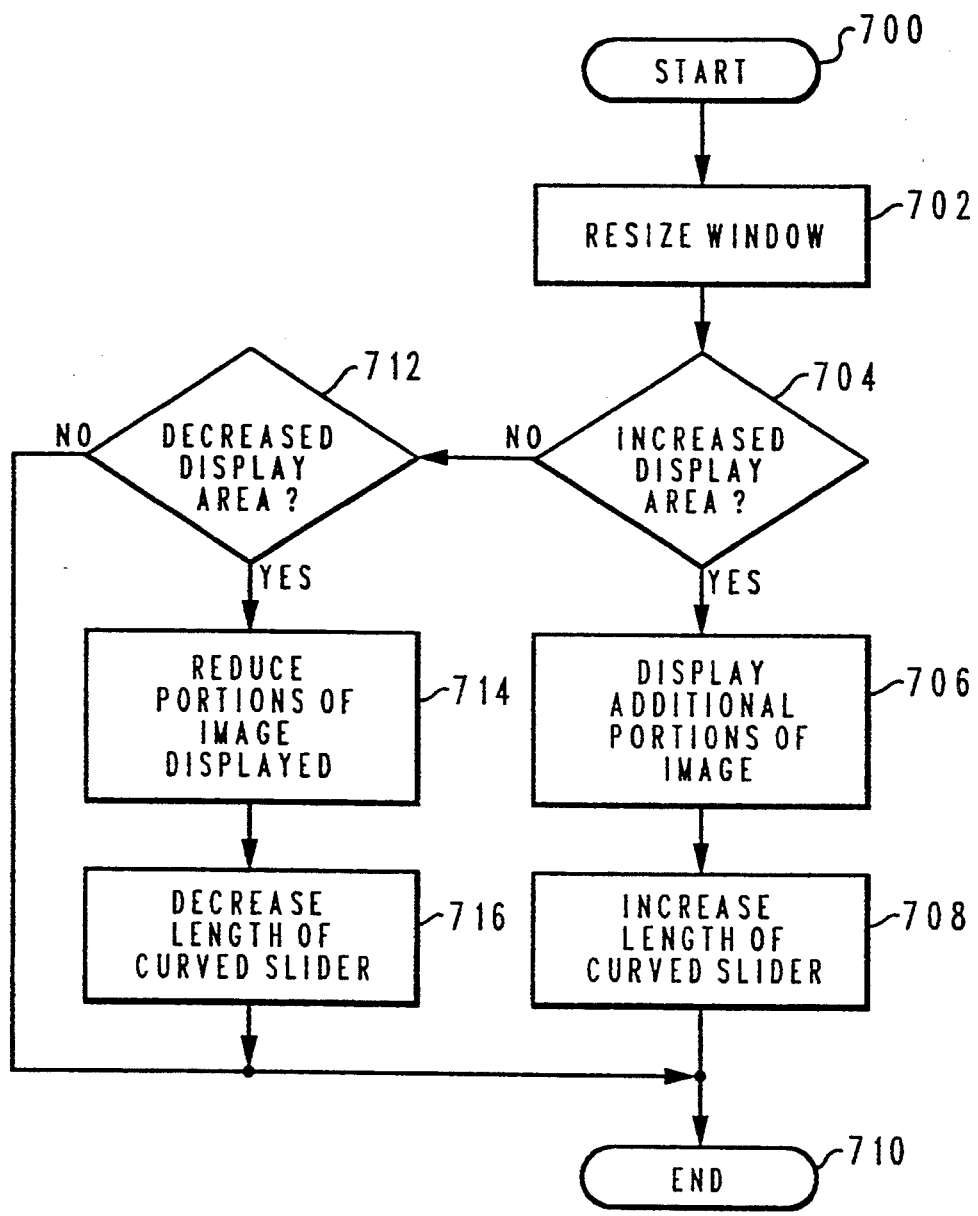
FIG. 7 depicts a high level logic flowchart illustrating a method and system for manipulating a wide-angle image in accordance with a preferred embodiment of the present invention.

Referring now to FIG. 7, a high level logical flowchart illustrating a method and system for manipulating a wide-angle image in accordance with a preferred embodiment of the present invention is illustrated. As depicted, the process begins in block 700 and thereafter passes to block 702. Block 702 depicts the resizing of a window containing a wide-angle image that is managed by a scrollcurve graphic interface in accordance with a preferred embodiment of the present invention. The process passes to block 704, which illustrates a determination of whether or not the display area has increased in the window. If the window can display more portions of the wide-angle image, the process advances to block 706, which illustrates displaying additional portions of the image within the resized window. The process then passes to block 708. Block 708 illustrates the increasing length of the curved slider in the scrollcurve graphic interface associated with this window. The curved slider is lengthened to graphically indicate the increased portions of the wide-angle image that are displayed within the window. Thereafter, the process terminates as illustrated in block 710.

Referring again to block 704, if the display area for the wide-angle image has not increased, the process proceeds to block 712, which depicts a determination of whether or not the display area has decreased. If less portions of the wide-angle image may be displayed within the resized window, the process advances to block 714. Block 714 illustrates the reduction of the number portions of the wide-angle image displayed in the window in response to the decreased display area.

The process then proceeds to block 716, which depicts the decreasing of the length of the curved slider in the scrollcurve graphic interface associated with this window. The curved slider is shortened to graphically indicate the decreased portions of the wide-angle image that are now displayed within the window. Thereafter, the process terminates as illustrated in block 710.

The scrollcurve graphic interface may be employed in uses other than manipulating wide-angle images. For example, a number of images may be aligned adjacent to each other, in a single graphics file. In such a situation, all of the images in the file may not be displayable on the screen of the video display device. A scrollcurve graphic interface may be employed to control the display the images.

In another example, a user may have multiple windows open in a GUI at any one time. If many windows are arranged side by side, it may be impossible to display all of the windows on a video display device to the user at one time in a manner that is usable by the user. The scrollcurve graphic interface of the present invention may be utilized to manipulate which windows are displayed to a user at any given time. In other words, a scrollcurve graphic interface may be employed to display or view areas that were previously "off" the screen.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system having a display device for efficiently managing the display of a wide-angle image which includes a plurality of segments, wherein only a portion of said plurality of segments may be simultaneously displayed within said display device at a selected resolution, said method comprising the data processing system implemented steps of:

providing a substantially circular icon, having a defined periphery, wherein each portion of said defined periphery corresponds to one or more of said plurality of segments of said wide-angle image;

providing a moveable control element along a selected arc, wherein said moveable control element is moveable along said defined periphery; and displaying within said display device one or more of said plurality of segments of said wide-angle image corresponding to each portion of said defined periphery within said selected arc, wherein display of said wide-angle image is efficiently managed.

2. The method of claim 1 further comprising the step of altering which of said one or more of said plurality of segments of said wide-angle image are displayed within said display device in response to an alteration of said selected arc as a result of a movement of said moveable control element about said defined periphery.

3. The method of claim 1, wherein said moveable control element has a specified length and further comprising the step of altering said specified length of said moveable control element in response to a user input.

4. A method for selectively manipulating the display of an image displayed within video display device in a data processing system, wherein said image is comprised of a plurality of segments and wherein said display of said image within said video display device is limited to only a portion of said plurality of segments at a given resolution, said method comprising the data processing implemented steps of:

displaying a portion of said plurality of segments within said video display device within said data processing system;

displaying a substantially circular control icon on said video display device;

displaying a control element along a selected section of said substantially circular control icon, wherein said control element is moveable along said substantially circular control icon and wherein said selected section corresponds to said portion of said plurality of segments being displayed; and altering said portion of said plurality of segments being displayed in response to a movement of said control element along said substantially control icon, wherein a graphic indication of display position within said wide-angle image is provided by said control element.

5. The method of claim 4, wherein the control element has a selectable length and further comprising the step of altering said selectable length of said control element in response to a user input.

6. A data processing system for efficiently managing the display of a wide-angle image which includes a plurality of segments, wherein only a portion of said plurality of segments may be simultaneously displayed within said display device at a selected resolution, said the data processing system comprising:

means for providing a substantially circular icon, having a defined periphery, wherein each portion of said defined periphery corresponds to one or more of said plurality of segments of said wide-angle image;

means for providing a moveable control element along a selected arc, wherein said moveable control icon is moveable along said defined periphery; and display means for displaying within said display device one or more of said plurality of segments of said wide-angle image corresponding to each portion of said defined periphery within said selected arc, wherein a graphic indication of a display position within said wide-angle image is provided by said control moveable element.

7. The data processing system of claim 6 further comprising means for altering said selected arc.

8. The data processing system of claim 7, wherein means for altering said selected arc includes means for moving said moveable control element about said defined periphery, wherein said moveable control element defines said selected arc.

9. The method of claim 6, wherein each portion of said defined periphery maps to one of said plurality of segments of said wide-angle image.

10. The data processing system of claim 6, wherein said moveable control element has a selectable length further comprising:

alteration means for altering said selectable length of said moveable control element in response to user input;

selection means for selecting a new selected arc responsive to said alteration means; and display means responsive to a new selected arc for displaying one or more of said plurality of segments of said wide-angle image corresponding to each portion of said defined periphery within said new selected arc.

11. The data processing system of claim 10, wherein said substantially circular icon is in an octagonal shape.

12. The data processing system of claim 10, wherein said substantially circular icon is in a circular shape.

13. The method of claim 1, wherein said step of providing a moveable control element including allowing said moveable control element to be selected by a pointer, wherein said moveable control elements remains along said selected arc after a manipulation by said pointer.

14. The method of claim 4, wherein said step of altering said portion of said plurality of segments includes altering said portion of said plurality of segments in response to a movement of said control element along said substantially circular control icon, wherein said movement is caused by a selecting said control icon element with a pointer, wherein said control element remains along said selected section after being selected by said pointer.

15. The data processing system of claim 6, further comprising selection means for selecting said moveable control element with a graphical pointing device, wherein said moveable control element remains along said selected arc after being selected by said graphical pointing device.

16. A data processing system for efficiently managing the display of an image containing a number of portions in which only some of said number of portions of said image may be displayed within said display device at a selected resolution, said the data processing system comprising:

means for providing an icon, having a defined periphery, wherein each section of said defined periphery corresponds to one of said number of portions of image;

means for providing a moveable control element along said defined periphery, wherein said moveable control icon is moveable along said defined periphery and defines a selected arc of said defined periphery; and display means for displaying within said display device said portions of said image corresponding to each portion of said defined periphery within said selected arc, wherein a graphic indication of a display position within said image is provided by said moveable control element.

* * * * *